United States Patent [19]
Kuno et al.

[11] Patent Number: 5,243,418
[45] Date of Patent: Sep. 7, 1993

[54] DISPLAY MONITORING SYSTEM FOR DETECTING AND TRACKING AN INTRUDER IN A MONITOR AREAG330201

[75] Inventors: Yoshinori Kuno, Oomiya; Kazuhiro Fukui; Hiroaki Nakai, both of Yokohama, all of Japan

[73] Assignee: Kabushiki Kaisha Toshiba, Kawasaki, Japan

[21] Appl. No.: 799,321

[22] Filed: Nov. 27, 1991

[30] Foreign Application Priority Data

Nov. 27, 1990 [JP] Japan .................. 2-320881
Aug. 16, 1991 [JP] Japan .................. 3-206004

[51] Int. Cl.$^5$ ............................................. H04N 7/18
[52] U.S. Cl. ..................... 358/108; 358/126; 382/1
[58] Field of Search ............. 358/126, 125, 105, 108; 382/1

[56] References Cited

U.S. PATENT DOCUMENTS

| | | | |
|---|---|---|---|
| 4,737,847 | 4/1988 | Araki et al. | 358/105 X |
| 4,739,401 | 4/1988 | Sacks et al. | 358/126 |
| 4,868,871 | 9/1989 | Watson, III | 358/126 X |
| 5,018,215 | 5/1991 | Nasr et al. | 382/1 X |
| 5,053,876 | 10/1991 | Blissett et al. | 358/126 X |
| 5,086,480 | 2/1992 | Sexton | 358/126 X |

FOREIGN PATENT DOCUMENTS

| | | |
|---|---|---|
| 2-59976 | 2/1990 | Japan . |
| 2-59977 | 2/1990 | Japan . |
| 2-59978 | 2/1990 | Japan . |
| 3-37354 | 6/1991 | Japan . |

*Primary Examiner*—Victor R. Kostak
*Attorney, Agent, or Firm*—Oblon, Spivak, McClelland, Maier & Neustadt

[57] ABSTRACT

A display monitoring system of the invention comprises an image pickup section for picking up an image including at least one of an object to be picked up and a background, a change detecting section for detecting an image changing area in the picked-up image, a tracking section for tracking the changing area, and a display monitoring system control section for controlling the tracking section, determining a tracking result, and performing predetermined processing. In addition, the system includes a display unit control section for outputting the data of the tracking area as data of a rectangular frame, and a display section for displaying the image picked up by the image pickup means together with the tracking area.

13 Claims, 9 Drawing Sheets

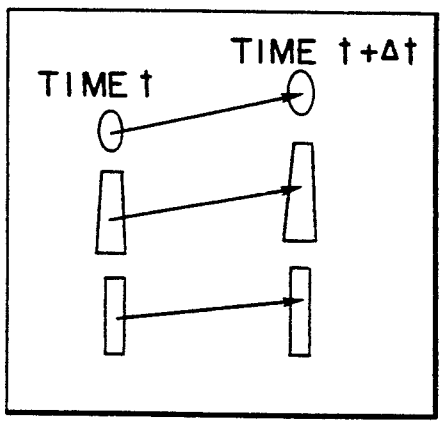
F I G. 1
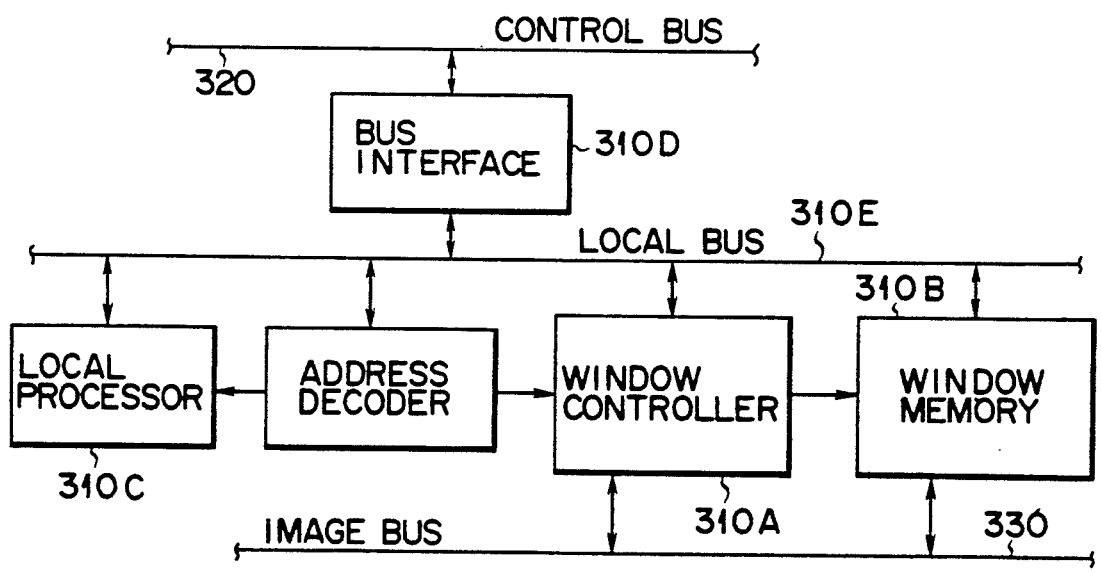
F I G. 3

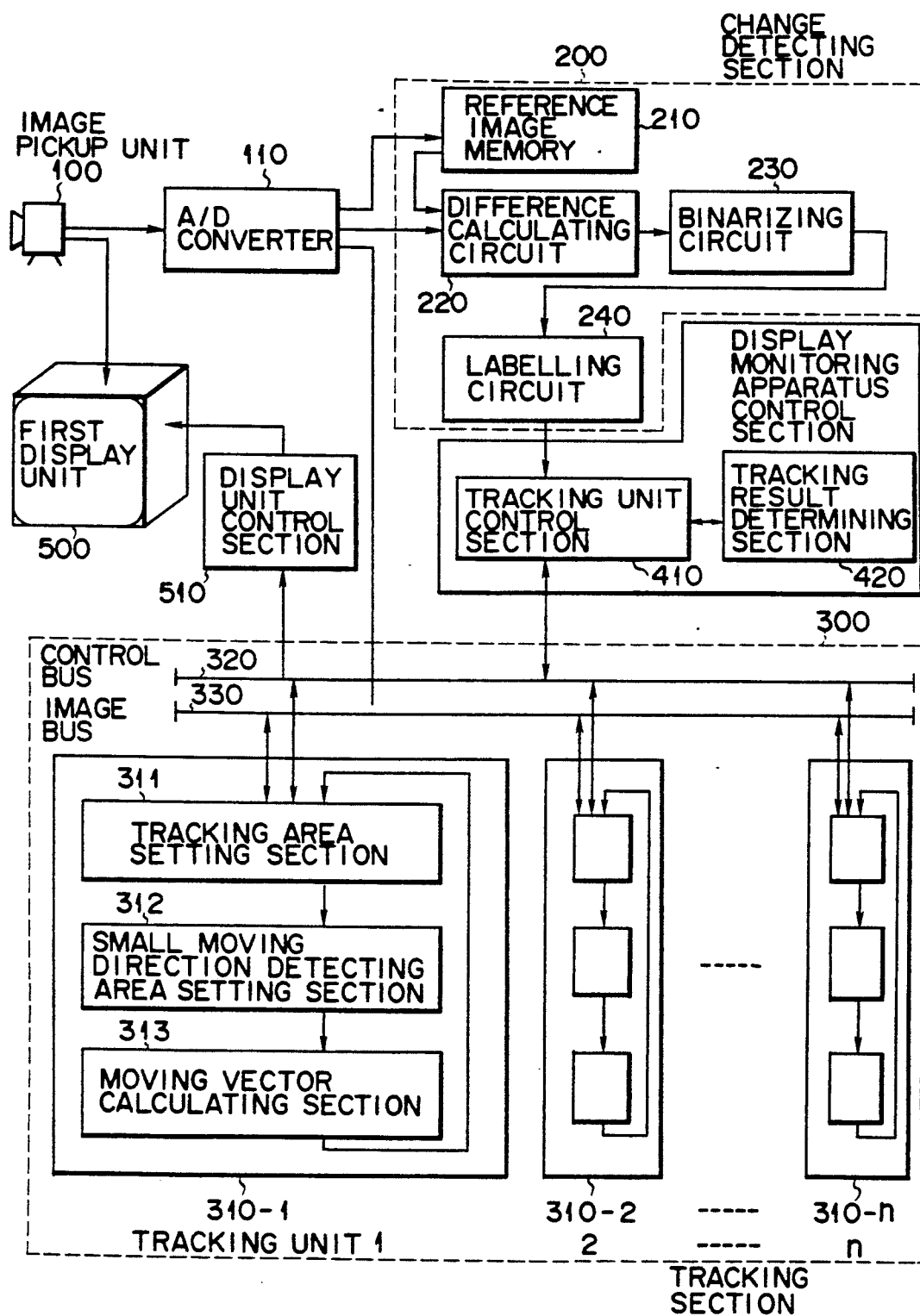
F I G. 2

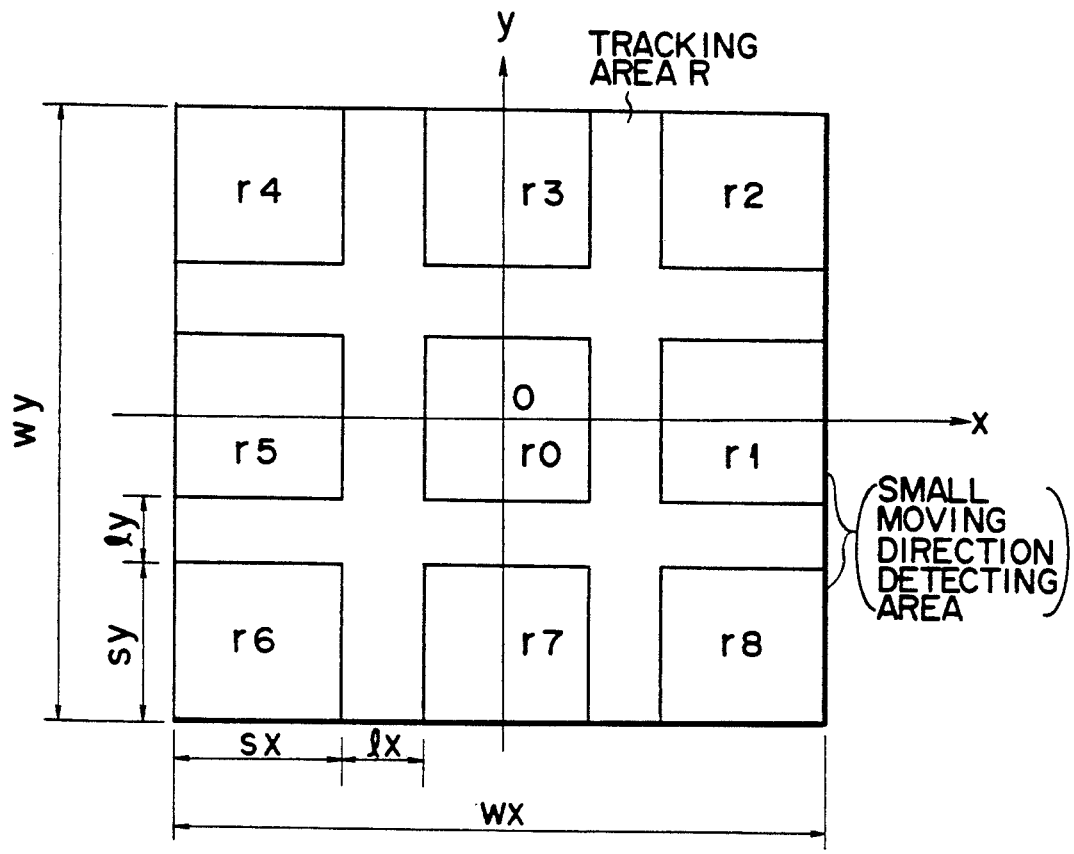
F I G. 4
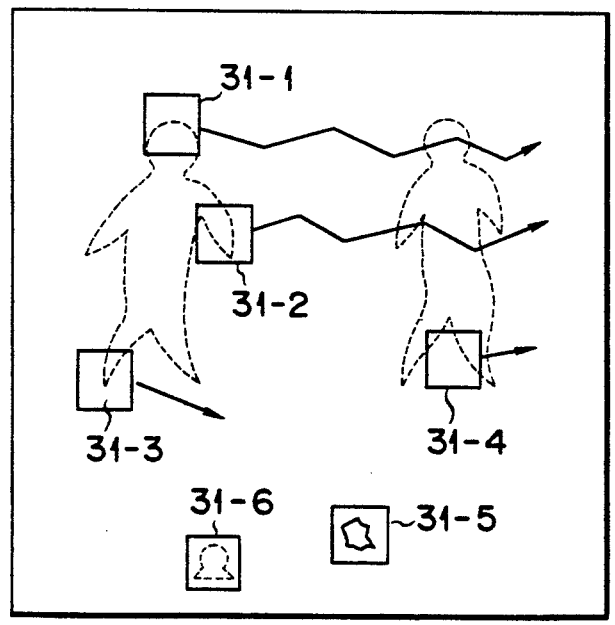
F I G. 5

1. FRONT EDGE TRACKING MODULE
2. FRONT OBLIQUE TRACKING MODULE
3. REAR OBLIQUE TRACKING MODULE
4. REAR EDGE TRACKING MODULE
5. REAR OBLIQUE TRACKING MODULE
6. FRONT OBLIQUE TRACKING MODULE

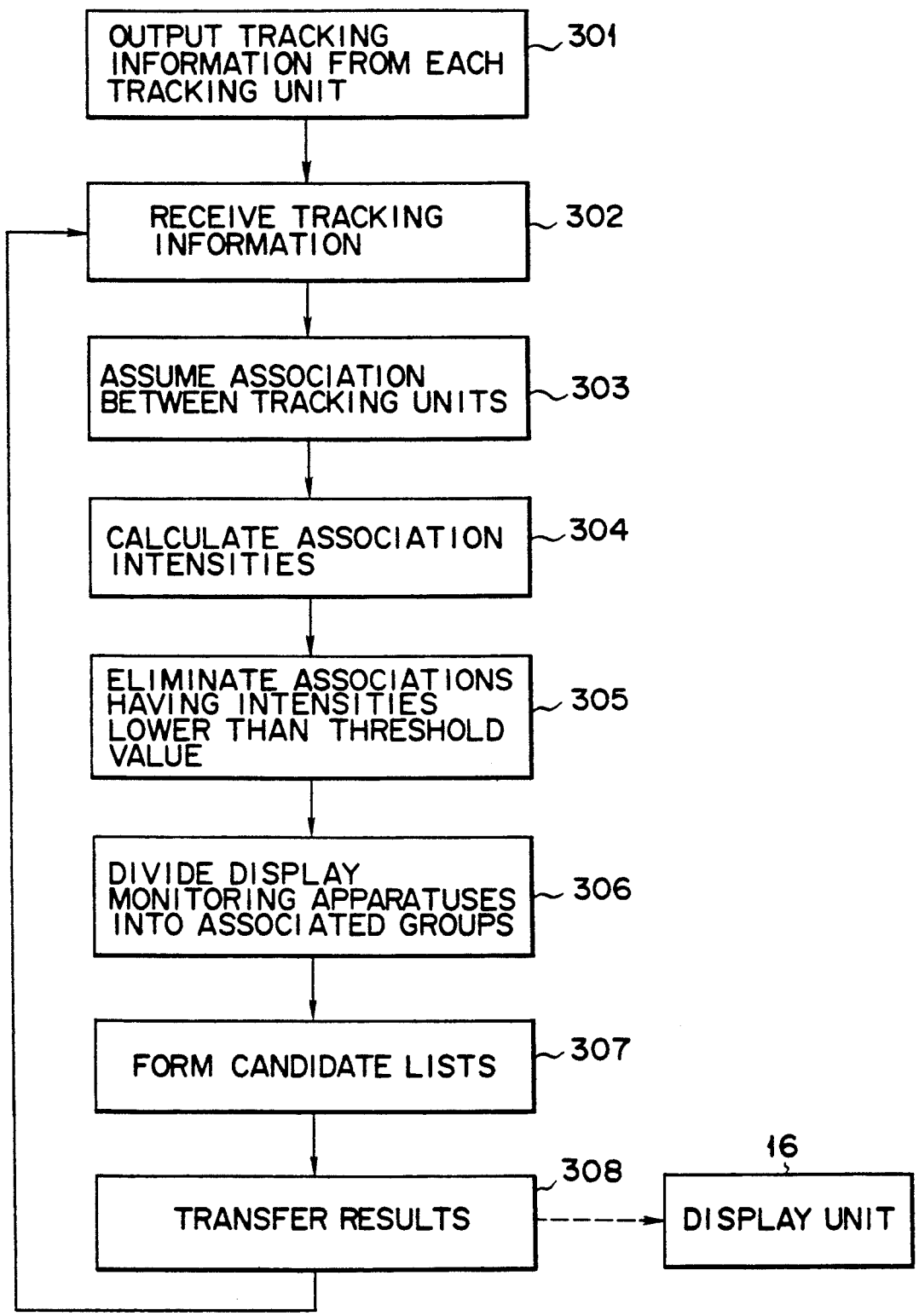
F I G. 11

DISPLAY MONITORING SYSTEM FOR DETECTING AND TRACKING AN INTRUDER IN A MONITOR AREAG330201

BACKGROUND OF THE INVENTION

1. Field of the Invention

The present invention relates to a display monitoring system for detecting and tracking a changing area in a picked-up image, especially, a moving object such as an intruder in a monitor area.

2. Description of the Related Art

Recently, various types of safety method have been studied to prevent crimes and the like in buildings and offices. For example, a display monitoring system has been put into practice. This system is designed to automatically detect an intruder or an intruding object in a monitor area by using an image pickup apparatus such as a TV camera. In order to detect intruding objects, many of such display monitoring systems employ a method of detecting a moving object by obtaining the differences between a plurality of images consecutively picked up at short time intervals, or the difference between a current image and a background image without any intruder or the like.

The following problems, however, are posed in the method of detecting a moving object by only detecting changes on the basis of such differences.

(1) In addition to an intruding object, noise caused by environmental variations is detected. It is difficult to discriminate an intruding object from the noise. Noise components caused by environmental variations correspond to changes in brightness due to illumination variations or changes in brightness at a given place due to reflection by a water surface or the sway of trees, and cause large differences in portions other than an intruding object. In the conventional method, therefore, objects to be detected cannot be reliably and selectively detected by removing the noise components.

(2) Since one changing area does not necessarily appear in a difference image of one intruding object, processing (e.g., removal of the above-mentioned noise, association of a plurality of changing areas originating from one object, determination of the presence/absence, number, and traces of intruding objects) subsequent to change area extraction processing cannot be accurately performed.

(3) Since influences of noise or the like caused in an picking up operation by an image pickup unit are detected together with an intruder or the like, it is very difficult to clearly separate the intruder or the like from the noise. That is, it is very difficult to detect one intruder as one area in an image.

As a method of solving the above-described problems, a block association processing scheme (Published Unexamined Japanese Patent Application Nos. 2-59976, 2-59977, and 2-59978) has been proposed.

In the block association processing scheme, as shown in FIG. 1, when an intruder is separated into a plurality of changing areas, i.e., head, body, and leg areas, in a difference image, corresponding change amounts between the changing area extracted at two consecutive time points are obtained by calculating feature amounts such as area and shape features. Moving vectors between the corresponding changing areas are then calculated and it is determined that the changing areas which have similar moving vectors originate from the same object. This scheme is effective as long as one object is always separated into the same constituent elements. In many cases, however, a changing area extracted on the basis of a difference does not necessarily correspond to a specific portion of an object.

For example, the reasons are:

(1) Changes in brightness due to illumination variations differently occur at the respective portions of a target object.

(2) If a target object is a three-dimensional object and has a depth and an uneven surface pattern, the appearance (area, shape, and the like) of the object changes in different directions.

(3) If a target object is not a perfectly rigid object (e.g., a man wearing clothing), the shape of the object changes at each time point.

(4) If a portion of a background and a portion of a target object have the same color or luminance, the same color or luminance portion of the target object is not detected as a changing area while the target object passes through the same color or luminance portion of the background.

In the states wherein corresponding changing areas are not necessarily detected at each time point as described above, since corresponding changing areas may not be present, moving vectors may not be obtained. Therefore, the block association processing scheme may not properly function. If the block association processing scheme fails or does not properly function as described above, serious problems are posed when it is applied to a monitoring system (display monitoring system).

In order to solve the above-described problems, a tracking means capable of tracking a moving object is employed in some cases. In the scheme using such tracking means, since a moving object is tracked, association between areas need not be performed. However, the tracking means of this scheme is used to analyze, e.g., the movement of a human being in many cases. According to the tracking method of the tracking means, a portion to be tracked, e.g., a marker (target) attached to an object to be measured (e.g., an arm or leg of a man), must be determined in advance. Therefore, it is impossible to sequentially detect many unspecified intruders in a monitor area and track them.

As a method of tracking unspecified targets in a monitor area, the following method is also proposed. This method employs a change detecting means for detecting a changing area which changes due to the movement of a moving object such as an intruder, with a tracking means arranged for the changing area detected by the change detecting means. With this arrangement, the moving object presumed to be present in the changing area is tracked.

For example, the following tracking methods are employed by the tracking means described above:

(1) tracking changes in brightness (pixel luminance) in a tracking area;

(2) tracking a specific form in a tracking area; and (3) determining a moving direction by calculating the correlation value between a tracking area and peripheral areas.

Since a given tracking means can track only a portion of a moving object, the following method is also proposed. In this method, after tracking processing is completed, tracking results are analyzed, and the tracking means are divided into groups in units of moving objects (i.e., the tracking means are associated in groups on the basis of the moving directions of the tracking means and their positional relationship). In addition, as a method of simultaneously detecting many unspecified moving objects in a monitor area, a method of using a plurality of tracking means is proposed.

According to the above-described method, even if some of the tracking means groups fail to track because of external disturbances such as noise and blocking by an object, compensation of such failures can be properly performed. If, however, moving objects cross each other in a complicated manner, it is very difficult to interpret tracking results. When objects which are moving in different directions are to be tracked by tracking means, even if they belong to the same moving object, e.g., the arms and legs of a man, these tracking means cannot be associated with each other in the same group. In such a case, therefore, it is impossible to detect the moving object.

As described above, in the conventional display monitoring system, since the influences of the phenomenon that changes in brightness occur in portions other than an intruding object as a target object cannot be eliminated, a detection error is inevitably caused. Therefore, when a plurality of changing areas originate from one object, it is difficult to identify the object.

Moreover, when moving objects such as intruders are to be tracked and detected by using a plurality of tracking means, if a plurality of objects, each of which moves in a complicated manner like a man, exist in a detection area, it is impossible to simultaneously detect the respective intruders.

SUMMARY OF THE INVENTION

According to the first aspect of the present invention, it is an object to provide a display monitoring system exhibiting excellent resistance to environmental variations, which determines the number and movement of intruding objects by removing noise components due to environmental variations, and associating a plurality of changes originating from one object, and can reliably track changing areas all the time even in a state in which association between the changing areas is not necessarily established.

A display monitoring system according to the first aspect of the present invention is characterized by comprising image pickup means for picking up an image including at least one of an object to be picked up and a background, change detecting means for detecting an area in which a portion of the picked up changes, said change detecting means including reference image storage means for storing a background image, as a reference image, which corresponds to the background picked up by said image pickup means, difference calculating means for obtaining differences between the reference image and the image including the object and the background, and outputting difference values, binarizing means for binarizing difference values higher than a predetermined threshold value, and extracting the binarized values as a plurality of changing areas, and labeling means for providing different labels for a plurality of blocks associated with each other as the changing areas, obtaining the area, position of center of gravity and circumscribed rectangle of each of the blocks, and outputting measurement data; tracking means for tracking the changing areas, said tracking means including at least one tracking element having tracking area setting means which moves upon movement of the block and sets a rectangular area including the rectangle as a tracking area, with the rectangle located in the center of the tracking area, small moving direction detecting area setting means for setting a plurality of small areas in the tracking area, and moving vector calculating means for calculating movement amounts of the changing areas in accordance with changes in parameter of each of the small areas; and display monitoring system control means for controlling said tracking means, performing determination of a tracking result, and performing predetermined processing by using the output from said labeling means, said display monitoring system control means including tracking section control means for controlling said tracking means, and tracking result processing means for determining on the basis of the tracking result from said tracking means whether the changing areas originate from an intruding object, and performing predetermined processing, and, in addition, the system is characterized by comprising display unit control means for outputting data of the tracking area as data of a rectangular frame, and display means for displaying the image picked up by said image pickup means together with the tracking area.

According to the first aspect of the present invention, one object is extracted as changing areas obtained by separating the object into a plurality of unspecified portions. In addition, by continuously tracking the changing areas, even if the object is separated differently at the respective time points, since tracking of noise components due to environmental variations does not result in a meaningless movement, the noise components can be removed, or the object can be identified when the tracking paths of the plurality of changing areas are similar to each other.

Even if, therefore, association between changing areas cannot be established, the changing areas can be reliably tracked, thereby realizing a display monitoring system exhibiting excellent resistance to environmental variations, which can remove noise components due to environmental variations, and can recognize the movement of one object by associating a plurality of changing areas originating from the same object.

According to the second aspect of the present invention, it is an object to provide a display monitoring system which can detect the movement of a plurality of intruding objects by simultaneously tracking the intruding objects and interpreting the tracking results, even if many unspecified intruding objects, each of which moves in a complicated manner like a man, are present in a detection area.

A display monitoring system according to the second aspect of the present invention is characterized by comprising image pickup means for picking up an image including at least one of an object to be picked up and a background; change detecting means for detecting an area in which a portion of the picked-up image changes, said change detecting means including reference image storage means for storing a background image, as a reference image, which corresponds to the background picked up by said image pickup means, difference calculating means for obtaining differences between the reference image and the image including the object and the background, and outputting difference values, binarizing means for binarizing difference values higher than a predetermined threshold value, and extracting the binarized values as a plurality of changing areas, and labeling means for providing different labels for a plurality of blocks associated with each other as the changing areas, obtaining the area, position of center of gravity, and circumscribed rectangle of each of the blocks, and outputting measurement data; tracking means for tracking the changing areas, said tracking means including at least one tracking element having tracking area setting means which moves upon movement of the block and sets a rectangular area including the rectangle as a tracking area, with the rectangle located in the center of the tracking area, small moving direction detecting area setting means for setting a plurality of small areas in the tracking area, and moving vector calculating means for calculating movement amounts of the changing areas in accordance with changes in parameter of each of the small areas; display monitoring system control means for controlling said tracking means, performing determination of a tracking result, and performing predetermined processing by using the output from said labeling means, said display monitoring system control means including tracking section control means for controlling said tracking means, candidate extracting means for obtaining a virtual association strength between said tracking elements for tracking the changing areas, and extracting each of groups of said tracking elements whose association strengths are higher than a predetermined value as candidates for moving objects, and result interpreting means for interpreting extraction results obtained by said candidate extracting means and forming moving paths of the moving object candidates; display unit control means for outputting data of the tracking area as data of a rectangular frame; first display means for displaying the image picked up by said image pickup means together with the tracking area and second display means for displaying an interpretation of the tracking result obtained by said result interpreting means.

According to the second aspect of the present invention, groups of tracking elements connected to each other by virtual associations having strengths higher than a predetermined value are extracted as candidates for moving objects, and at the same time, the moving paths of the moving objects are interpreted from the extraction results. Therefore, even if many unspecified intruding objects, each of which moves in a complicated manner like a man, are present in a detection area, the movement of the intruding objects can be detected by simultaneously tracking the traces of the intruding objects and interpreting the tracking results. That is, even in a case wherein many unspecified intruders exist in a monitor area, and each intruder moves in a complicated manner, e.g., crossing movement, so that it is very difficult to interpret the tracking results after the tracking processing, the moving path of each intruder can be detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view for explaining a conventional scheme;

FIG. 2 is a block diagram showing a schematic arrangement of the first embodiment of the present invention;

FIG. 3 is a block diagram showing an arrangement of a tracking unit;

FIG. 4 is a view for explaining a tracking area and small areas for detecting moving direction;

FIG. 5 is a view showing a case wherein one object separated into a plurality of changing areas is tracked;

FIG. 11 is a flow chart for explaining an operation of the embodiment in FIG. 10;

DETAILED DESCRIPTION OF THE PREFERRED EMBODIMENT

Figure 6:
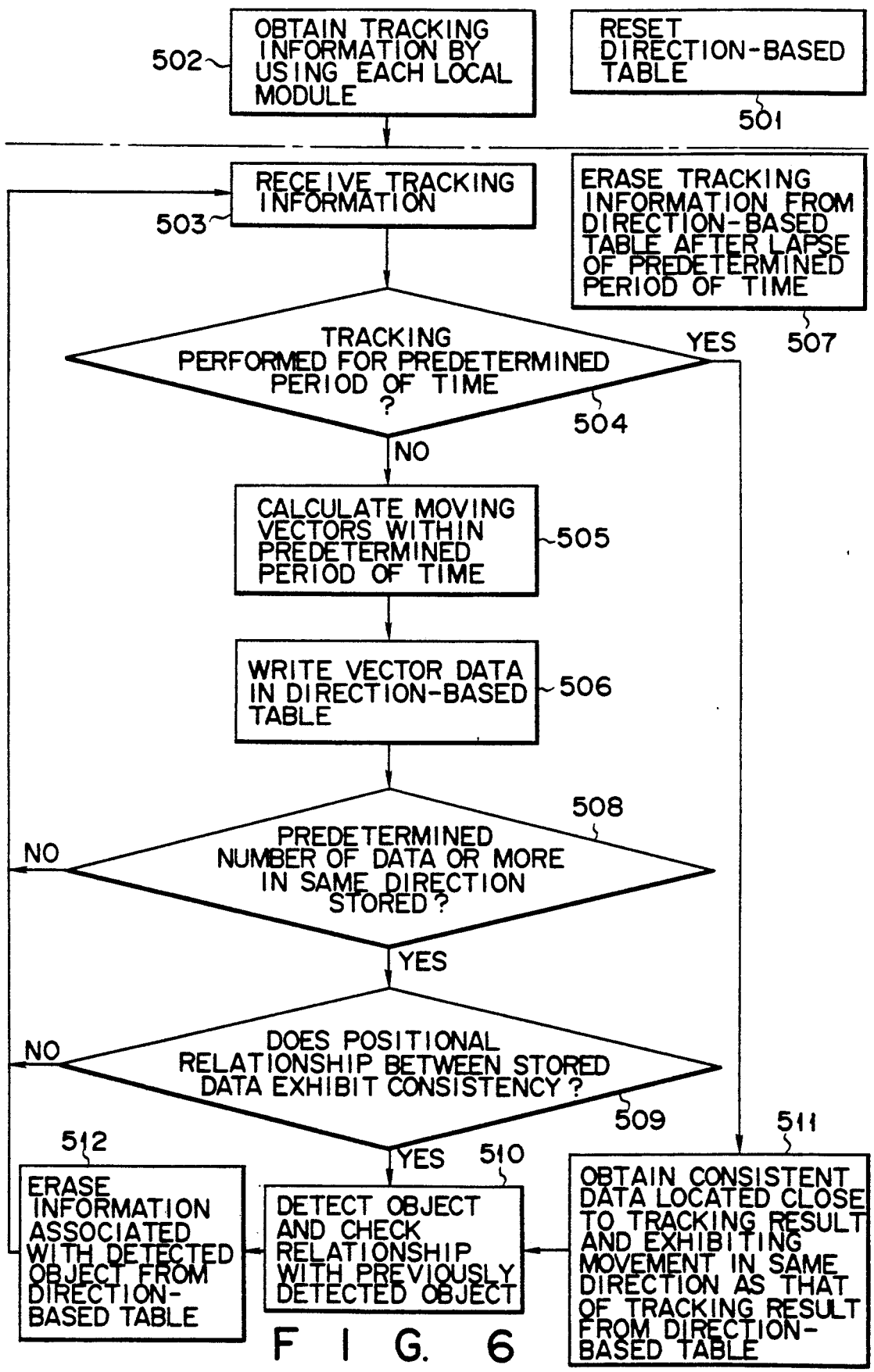
FIG. 6 is a flow chart showing tracking result determination processing.

The first embodiment of the present invention will be described below with reference to the accompanying drawings.

FIG. 2 shows a schematic arrangement of a display monitoring system of the present invention. This display monitoring system comprises a TV camera 100 for picking up an image, a change detecting section 200 for detecting a changing area in a picked-up image, a tracking section 300 for tracking a changing area, and a display monitoring system control section 400 for controlling the tracking section 300 and interpreting a tracking result. In addition, the display monitoring system includes an A/D converter 110 for converting a signal from the TV camera 100 into a digital signal, a display unit control section 510 for receiving a signal from a tracking unit 310 and controlling a display unit, and a first display unit 500 constituted by a CRT for displaying an image picked up by the TV camera 100 and an area tracked by the tracking section 300.

The function of each component of the present invention will be described in detail below.

An image picked up by the TV camera 100 is supplied to the A/D converter 110 to be converted into a digital signal. The digital signal is then supplied to the change detecting section 20 and the tracking section 300.

The change detecting section 200 is constituted by a reference image memory 210 for storing a background image picked up by the TV camera 100 when no target object exists, or an image (to be referred to as a reference image hereinafter) obtained before an picking up operation, a difference calculating circuit 220 for obtaining the difference between the picked up and the reference image stored in the reference image memory 210, a binarizing circuit 230 for binarizing the difference obtained by the difference calculating circuit 220 by using a proper threshold value to indicate whether the difference is a changing portion, and extracting a portion exhibiting a great change with respect to the reference image, and a labeling circuit 240 for respectively providing different labels for associated components as changing areas in a difference image, and obtaining the area, position of the center of gravity, and circumscribed rectangle of each associated component.

The tracking section 300 is constituted by a plurality of tracking units 310 (to be described in detail later), a control bus 320, and an image bus 330.

In this embodiment, the tracking section 300 is constituted by a plurality of multiprocessors. Each processor portion of the multiprocessors is constituted by the tracking unit 310. One tracking unit 310 tracks one associated component. The plurality of tracking units 310-1 to 310-n can be independently operated at the same time. If only a small number of tracking units 310 are used, one tracking unit 310 may be designed to track a plurality of associated components. Each tracking unit 310 receives a command from the display monitoring system control section 400 through the control bus 320, and transmits a processing result to the display monitoring system control section 400. In addition, the tracking unit 310 can receive an arbitrary portion of a motion image from the A/D converter 110 through the image bus 330. The tracking unit 310 itself sets a large rectangular area as a tracking area, which includes the circumscribed rectangle of an associated component (to be tracked), designated by a tracking unit control section 410, in the center of the area. In addition, the tracking units 310 tracks a changing portion in the tracking area to track at least a portion of an intruder as a moving object.

For example, as a tracking method, the tracking unit 310 uses a method of tracking a changing area on the basis of changes in pixel luminance in a tracking area with the lapse of time. In this case, if no change in pixel luminance in the tracking area is detected, or the amount of movement of a moving object is 0, a failure in tracking is determined, and the tracking operation is stopped. The tracking units control section 410 for controlling the tracking unit 310 includes a table memory (not shown) for recording the state of each tracking unit 310 and records the current state (e.g., "tracking" or "being stopped") of a tracking unit 310. If, for example, the tracking unit 310 stops tracking halfway, the description on a portion for indicating the state of the tracking unit 310 is changed from "tracking" to "being stopped".

The display monitoring system control section 400 controls an operation of the overall system. In this embodiment, the display monitoring system control section 400 includes the tracking unit control section 410 for commanding the tracking section 30 to track the associated component when an area exceeding a predetermined area is detected in the associated component by the labeling circuit 240, and a tracking result determining section 420 for determining a tracking result. The display monitoring system control section 400 is realized by a workstation or a personal computer. Alternatively, the section 400 can be realized by a microprocessor, if the section need not be formed into an independent computer (like a workstation or a personal computer).

FIG. 3 shows an arrangement of one tracking unit 310. When the position (address) of a portion, of an image, which is required to be extracted is set in the register of a window controller 310A by the display monitoring system control section 400 or a local processor 310C, the set portion of the image flowing through the image bus 330 can be input to a window memory 310B. The local processor 310C processes the image input to the window memory 310B. Setting of the register of the window controller 310A can be performed through both the display monitoring system control section 400 and the local processor 310C. A bus interface 310D serves to switch these components for performing such a register setting operation. When the display monitoring system control section 400 is to perform a setting operation, the bus interface 310D connects the control bus 320 to a local bus 310E. When the local processor 310C is to perform a setting operation, the bus interface 310D disconnects the control bus 320 from the local bus 310E.

A tracking operation will be described below, in which one tracking unit 310 tracks one associated component.

(1) A tracking area setting section 311 determines a rectangular area having a proper size including the circumscribed rectangle of the associated component located in the center of the area, and sets the position (address) of the rectangular area in the register of the window controller 310A. This setting operation may be performed by the display monitoring system control section 400 or by the tracking unit 310 upon transmission of information on the associated component to the tracking unit 310.

(2) An image of a portion of the set area, picked up at a current time point (time t), is fetched from the image bus 330 to the window memory 310B.

(3) An image of the same portion of the set area, picked up at the next time point (time $t+\Delta t$), is fetched to the window memory 310B.

(4) A tracking area R is set such that an arbitrary point o (e.g., the center of gravity) set on the associated component is located in the center of the area.

(5) In a small area detecting moving direction setting section 312, small areas (e.g., areas r0 to r8 in FIG. 4) are set in the tracking area R set in step (4). For example, assuming that the overall image has a size of $512 \times 512$ pixels, the sizes of the respective areas are set to satisfy $Wx = Wy = 50$ pixels and $sx = sy = 1x = 1y = $ about 10 pixels. Alternatively, the sizes of the respective areas may be variably set in accordance with the area of the associated component or the size of the circumscribed rectangle. In this embodiment, $3 \times 3 = 9$ small areas are set. However, $n \times m = nm$ small areas (n and m are arbitrary integers) may be set.

(6) With respect to each small area ri, the following equation is calculated:

$d(i) = Vi(t+\Delta t) - Vi(t)$ where $Vi(t+\Delta t)$ is the average value of the densities of the pixels in the small area at time $t+\Delta t$, and $Vi(t)$ is the average value at time t. If, however, the calculated value of the above equation is equal to or below a threshold value (th), then $d(i) = 0$.

(7) In a moving vector calculating section 313, a moving vector (u,v) is calculated by using d(i) according to the following equations:

$$u = f \cdot \sum_{i=0}^{8} d(i) \cdot xi / \sum_{i=0}^{8} d(i)$$

-continued
$$v = f \cdot \sum_{i=0}^{8} d(i) \cdot yi / \sum_{i=0}^{8} (i)$$

(Note that $\sum_{i=0}^{8}$ can be written into a general form of $\sum_{i=0}^{nm-1}$)

where xi and yi are the coordinates of the center of a small area i when point o is set as the origin, and f is a coefficient arbitrarily set in accordance with an application. The coefficient f is determined by the difference in brightness between a background and a target object or the moving speed of an object on an image and is set to be about 0.5 to 2 in accordance with an application. A tracking operation corresponding to one frame is completed by obtaining a moving vector as in this step.

(8) A tracking operation for the next frame is started in the following manner. A new tracking area is set by moving center 0 of the tracking area R in the previous frame by an amount corresponding to the moving vector obtained in the previous frame. A rectangular area for a new image input is determined by the tracking area setting section 311 by referring to the moving vector of the previous frame, and the image of the portion of the rectangular area at the time point $t+\Delta t$ and an image of the same portion at a time point $t+2\Delta t$ are fetched to the window memory 310B, thus starting the tracking operation. Subsequently, a new moving vector is obtained by performing steps (2) to (7) in the same manner as described above.

In the above-described manner, tracking is performed by sequentially moving tracking areas using moving vectors obtained in the respective tracking areas.

The above-described operations of the tracking section 300 can be visualized by the first display unit 500. A tracking area set by the tracking area setting section 311 is output, as, e.g., a frame, from the display unit control section 510, so that the frame representing the tracking area and an image input from the TV camera 100 are simultaneously displayed on the first display unit 500. FIG. 5 shows an example of the display state of the first display unit 500. Note that FIG. 5 shows frames at two different points on the same screen for the sake of descriptive convenience, but a detailed description thereof will be given later.

As described above, the display monitoring system of this embodiment can reliably and consecutively track changing areas. In addition, on the basis of the tracking result, noise components caused by environmental variations can be discriminated from a target object, or the movement of an object can be tracked by determining that a plurality of changing areas originate from the same object.

In this case, the relationship in operation between the change detecting section 200, the tracking section 300, and the tracking result determining section 420 can be set by several methods, as follows, in accordance with target objects and applications.

[1] In a case wherein only one target object enters a frame, or only one object is to be detected In this case, the simplest method can be used. A state in which a change detecting operation is performed is maintained. When a changing area is detected, the change detecting operation is stopped, and only tracking processing is performed. Assume that only one object is to be detected, but a plurality of changing areas are present. In this case, the simplest method is to track only the maximum area of the changing areas. If a multi-processor system is to be used as in this embodiment, the plurality of changing areas are tracked by using different tracking units 310.

If no moving vector is detected in tracking processing of the tracking unit 310, it may be considered that a tracking failure occurred, or a target object stands still, or an extracted changing area is not associated with a moving object. In this case, the tracking processing is stopped, and a change detecting operation is resumed. Even if no moving vector is detected depending on the characteristics of an object, tracking need not be immediately stopped, but may be stopped only if no vector is detected at several time points.

A tracking result determination program, which operates on the display monitoring system control section 400, is designed to determine the movement of a target object on the basis of a tracking result during the above-described processing. Assume that one target object is to be tracked. In this case, after tracking is performed for a predetermined period of time, it is determined that the tracked object corresponds to the movement of the target object. If the target object is stopped halfway, the tracking section 300 temporarily stops tracking the target object. When the target object starts to move again, a change occurs in a portion of the target object. When this change is detected by the change detecting section 200, a tracking operation with respect to the change is started again. Therefore, even though tracking is interrupted halfway, if tracking is started again from a position near the position where the previous tracking operation is interrupted, tracking is considered as a series of small movements of the target object to determine the overall movement of the target object.

Even if a plurality of changing areas are tracked, one object is to be detected. Therefore, when no vector is detected in a given changing area halfway upon tracking, tracking is stopped at this time point. In this case, if any one of the changing areas can be continuously tracked so that it can be determined that the changing area corresponds to the movement of the target object, it is considered that the purpose of the operation is fulfilled. If tracking of all the changing areas fails, a change detecting operation is started again.

[2] In a general case wherein the number of objects is not limited to one

In this case, it is required that the change detecting section 200 be incessantly moved, or more complicated processing is performed by the tracking result determining section 420. In this embodiment, the detecting section 200 is incessantly moved. When a changing area is detected, one of the tracking units 310 is assigned to the changing area to perform tracking in the same manner as in case [1]. However, if an object is present in an image, since changing areas are incessantly produced in difference calculation results, some consideration must be given to prevent a given tracking unit from tracking a portion which has been tracked by another tracking unit. For this purpose, in this embodiment, when a changing area is extracted, it is checked whether a tracking result is obtained near the changing area. More specifically, when the display monitoring system control section 400 receives the data of the center of gravity of a changing area and the position data of its circumscribed rectangle from the change detecting section 200, the section 400 checks tracking results obtained by the tracking units which are currently performing tracking processing. If a tracking portion is present near the changing area, tracking processing with respect to the changing area is not started.

In addition, properness of tracking processing may be confirmed in the following manner. If tracking processing is proper, a changing area should exist at a position to which tracking is performed by obtaining a moving vector. Therefore, when a tracking unit obtains a moving vector in the process of tracking, it transmits the information of the moving vector to the display monitoring system control section 400. The display monitoring system control section 400 checks whether the position of the moving vector is in the circumscribed rectangle of a given changing area, or a portion near the position of the moving vector is converted into a changing area by the binarizing circuit 230. If the checking result indicates that the two conditions described above are satisfied, the tracking processing is continued considering that the tracking operation is properly performed. Otherwise, the tracking operation is stopped considering that the tracking processing fails. In this case, a tracking failure may not be determined by one result, but the tracking operation may be stopped if such phenomenon occurs a plurality of times. With this processing, tracking processing can be more reliably performed.

[2-1] Simple case

Tracking result determination processing by the display monitoring system control section 400 is performed in the following manner. If one target object is reliably detected by the change detection section 200, or a plurality of objects have a constant positional relationship, determination processing may be performed in the same manner as in the case of one target object. Such a case may occur when the contrast between an object and a background is high, and the object is a flat rigid body. In this case, if an individual tracking result is continuously obtained for a certain period of time, it may be determined that there is an object having such movement. Even if a plurality of changing areas are present, since the mutual positional relationship between the changing areas is constant, the presence of one object may be determined by associating portions maintaining such positional relationship on the basis of individual tracking results.

[2-2] General case

In a general case, for example, a phenomenon in FIG. 5 occurs. FIG. 5 shows frames at two different time points on the same screen. Referring to FIG. 5, two human figures drawn in dotted lines indicate the positions of the same intruder at two time points. The right human figure is obtained by performing tracking processing at several time points after the left human figure is obtained. Referring to FIG. 5, of tracking units (31-1, 31-2, 31-3) which are tracking the same intruder, some unit (31-4) interrupts tracking because of the failure of tracking processing, some unit (31-4) is assigned to a new changing area and starts tracking, some unit (31-5) can hardly track a changing area which was once tracked, and some unit (31-6) is assigned to a changing area originating from another object. The display monitoring system according to this embodiment is required for the case shown in FIG. 5.

FIG. 6 is a flow chart showing tracking result determination processing performed by the tracking result determining section 420 of the display monitoring system control section 400.

A proper number (e.g., 16) of tracking directions are set in an image, and a direction-based table is prepared to store tracking results in units of directions. The table is reset at the start time of the system (step 501).

Changing areas are detected by the respective tracking units, and the changing areas are tracked (step 502). The tracking result determining section 420 receives intermediate tracking results (moving vectors obtained in units of frames) from the respective tracking units 310 (step 503).

If one tracking unit continues a tracking operation for a predetermined period of time or more (YES in step 504), it is certain at this time point that an object exists. In the direction-based table, therefore, data of directions similar to the moving direction of the object are checked to select data exhibiting consistency in terms of position and time (step 511), and it is determined that the object is detected (step 510). If one tracking unit does not continue a tracking operation for the predetermined period of time or more (NO in step 504), moving vectors within the predetermined period of time are calculated (step 505). In step 505, moving vectors obtained in the respective frames may be directly used. However, in general, including a case wherein the movement of an object on an image is slow, the sum of moving vectors in several frames is obtained. In this case, the sum of vectors in a predetermined number of frames may be obtained, or addition of moving vectors may be continuously performed until the sum exceeds a predetermined value to obtain the movement between the corresponding frames. The former processing is performed as a smoothing operation because there is a possibility that moving vectors are unstable in a movement for a short distance.

The vectors obtained in step 505 are written in the direction-based table (step 506). In this step, time data are recorded as well as the data of the positions and magnitudes of the vectors. In this embodiment, data is sequentially erased from the direction-based table after the lapse of a predetermined period of time (507). Therefore, the data indicated by (31-5) in FIG. 5 to which tracking is hardly performed is erased from the table after the lapse of the predetermined period of time, thus preventing adverse effects on detection of an object. When a given tracking unit cannot track a portion, the tracking unit informs the display monitoring system control section 400 of the tracking failure, and no processing is performed with respect to the portion. If the method of accumulating moving vectors is to be employed, the data of a portion which does not reach a predetermined size within a predetermined period of time is not written in the direction-based table.

Subsequently, it is checked whether a predetermined number of data or more in the same direction as those obtained in step 506 are stored in the table (step 508). If NO in step 508, the flow returns to step 503 to receive tracking information at the next time point. If YES in step 508, the position and time data of the accumulated moving vectors in the direction (data in adjacent directions may also be checked) to obtain a consistent portion (step 509). If no consistency is detected (NO in step 509), the flow returns to step 503 to receive tracking information. If consistency is detected (YES in step 508), it is determined that one object is detected (step 510).

In many cases, a tracking operation can be satisfactorily performed by only the above-described processing depending on a field of view, a predetermined tracking length, or the number of moving vectors. In a case wherein the tracking length is small in an image, an object may have been detected already. Therefore, it is checked whether any one of already-detected results is continuous with a current result. If such an object is present, it is determined that the same object is detected (step 510).

Assume that an object crossing the screen (field of view) is present. In this case, when a moving vector approaches the periphery of the screen, YES is obtained in both steps 504 and 508.

If an object is detected, moving vector data based on the object are erased from the direction-based table (step 512), and the flow returns to step 503 to receive tracking information.

A display monitoring system according to the second embodiment of the present invention will be described below with reference to the accompanying drawings.

A system of this embodiment is an apparatus which is improved for the first embodiment to track a plurality of tracking objects with accuracy.

Figure 10:
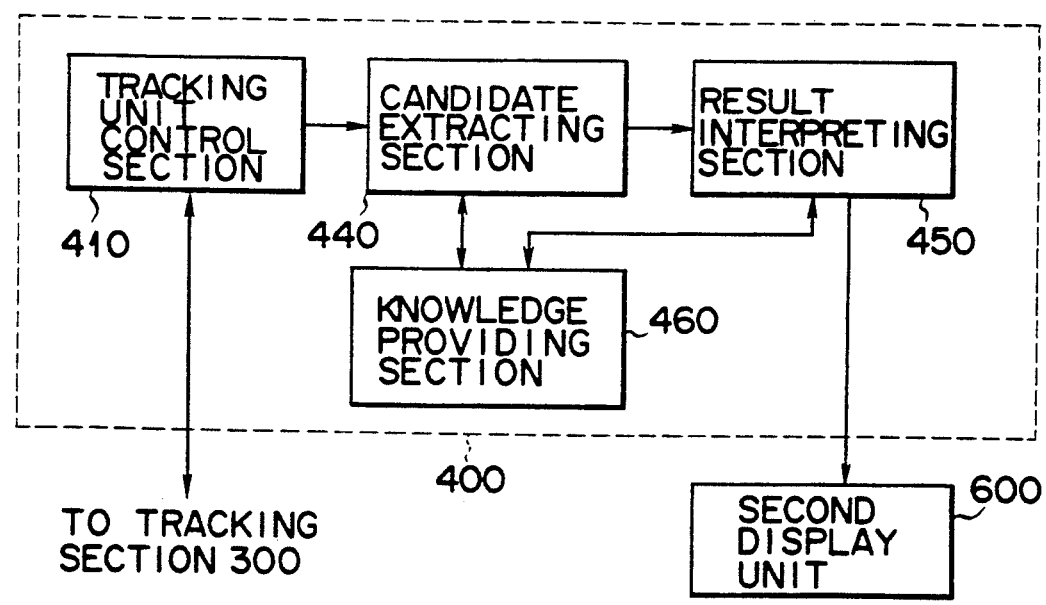
FIG. 10 is a block diagram showing a schematic arrangement of the second embodiment of the present invention.

FIG. 10 shows a schematic arrangement of a display monitoring system control section 400 of the display monitoring system of the second embodiment. The second embodiment i different from the first embodiment in that the tracking result determining section 420 of the display monitoring system control section 400 is replaced with a candidate extracting section 440, a result interpreting section 450, and a knowledge providing section 460, and the system includes a second display unit 600 constituted by a CRT for displaying an interpretation result obtained by the display monitoring system control section 400 for interpreting a tracking result. Since other constituent elements and operations are the same as those in the first embodiment, a description thereof will be omitted.

The display monitoring system control section 400 includes the candidate extracting section 440, the result interpreting section 450, and the knowledge providing section 460 in addition to a tracking unit control section 410.

Similar to the first embodiment, the tracking unit control section 410 serves to control each tracking unit 310. A change detecting section 200 is always kept operated. When a changing area is detected, one of the tracking units 310 which is not currently performing a tracking operation is assigned to the changing area to start tracking.

If, however, an intruding object exists in a detection area, similar to the first embodiment, the tracking unit control section 410 is required to prevent a given tracking unit 310 from tracking a portion which has been tracked by another tracking unit 310. In this case, each tracking unit 310 which is performing tracking processing transmits time-series data (tracking result) in its own moving path to the tracking unit control section 410 sequentially or after a predetermined amount of data are accumulated. The tracking unit control section 410 collects results from all the tracking units 310 and transmits the results to the candidate extracting section 440, which is extracting candidates of a moving object, sequentially or after a predetermined amount of data are accumulated. (The word "candidate" will be used as a synonym for "a candidate for a moving object" hereinafter).

Similar to the first embodiment, a first display unit 500 visualizes an operation of a tracking section 300. FIG. 5 shows an example of a display on the screen of the first display unit 500, as in the first embodiment.

In some conventional method, tracking units which are tracking one moving object are separated as a group in tracking result determination processing. That is, in this method, tracking units regard objects moving in the same direction as a group. This method can also be designed to prevent a tracking unit which is assigned to a changing area which does not originate from substantially constant movement, such as the tracking unit (31-6) assigned to the changing area originating from another object, from being included in a group. However, when a non-rigid object such as a man moves, portions of the object move differently in most cases. Therefore, the above-described method cannot be properly applied to a case wherein tracking units (31-1, 31-2, 31-3) are tracking the sam intruder and moving differently at each time point.

In this embodiment, by simultaneously referring to the moving directions of tracking units and their mutual positional relationship, candidate data of a moving object which can be determined to be an intruder is extracted at the same time as tracking processing results are transmitted. Thereafter, the candidate data are continuously interpreted in corresponding moving paths to check the validity of each candidate, thus stably detecting a target object which moves in a complicated manner.

FIG. 11 is a flow chart showing the candidate extraction processing by the display monitoring system control section 400.

Tracking information is output from each tracking unit 310 to the tracking unit control section 410 (step 301). Upon reception of the output results from the tracking unit control section 410 (step 302), the candidate extracting section 440 assumes a virtual association between two tracking units 310 (step 303). In step 303, outputs from the tracking units 310 which are not performing tracking processing are excluded.

The strength of association is calculated (step 304). The strength of association is calculated by using an estimation function assuming a value which is increased when the moving paths (the moving directions and speeds) of the tracking units 310 are similar to each other. The estimation function is set in the candidate extracting section 440 in advance. The following is an example of an estimation function:

$$s = Kp(t) \cdot F(p1(t), p2(t)) + Kv(t) \cdot G(v1(t), v2(t))$$

where s is the association strength, t is time, p1(t), p2(t), v1(t), and v2(t) are the position of a tracking unit 310-1 at time t, the position of a tracking unit 310-2 at time t, the speed of the tracking unit 310-1 at time t, and the speed of the tracking unit 310-2 at time t, respectively, F and G are preset functions based on the position and speed of each tracking unit 310 as arguments, respectively, and Kp(t) and Kv(t) are coefficients for the functions F and G, which can vary with time.

When the association strengths are calculated in step 304, only associations having strengths higher than a predetermined threshold value are left, but other associations are eliminated (step 305).

The candidate extracting section 440 divides the associated tracking units, which are left after the processing in step 305, into groups (step 306). A candidate list at a current time point is formed considering each group as a candidate for a moving object (step 307). If a plurality of intruders exist in a monitor area, and the tracking units 310 are tracking respective intruders, moving object candidates for each intruder are extracted, and at the same time, a candidate list is formed at each time point at which tracking results are obtained, and the candidate lists are sequentially stored and accumulated in the display monitoring system control section 400, thus forming a candidate list time series. If the time range of tracking result to be processed is limited to a current time point, a candidate list time series includes only candidates at a current time point. In this case, after tracking processing is performed, candidate lists are sequentially formed and supplied to the result interpreting section 450. In addition, if the time range in which processing is to be performed includes a plurality of time points, candidate lists at a plurality of time points are accumulated by the process for forming a candidate list time series (step 308), and the lists are supplied, as time series data, to the result interpreting section 450. In this step, the results are also transferred to the second display unit 600.

When the processing within the time range is completed, the flow returns to step 302, and the processing from step 302 to step 308 is repeated (A "candidate list string" will be used as a synonym for time-consecutive time series data of "candidate lists" hereinafter).

Tracking processing is not always successfully performed by the tracking section 300. In an extreme case, in the process of tracking a given object, the tracked object is replaced with another object. If this happens within a certain time range, the time series data of candidate lists obtained from tracking results within the time range is recorded in such a manner that some unit of the tracking units 310 belonging to one candidate fails in tracking halfway and is removed from the candidate, and a newly assigned tracking unit 310 is added to the candidate halfway. In such a case, time series data of candidate lists output from the candidate extracting section 440 itself does not represent the moving path of each moving object.

In this embodiment, a candidate list string is supplied to the result interpreting section 450. The result interpreting section 450 converts the candidate list string into a data string representing the moving path of a moving object by referring to knowledge provided from the knowledge providing section 460. In this case, the result interpreting section 450 is operated concurrently with the candidate extracting section 440. Meanwhile, the knowledge providing section 460 is operated so that the knowledge can be provided as soon as the result interpreting section 450 or the candidate extracting section 440 requires to refer to it.

Figure 12:
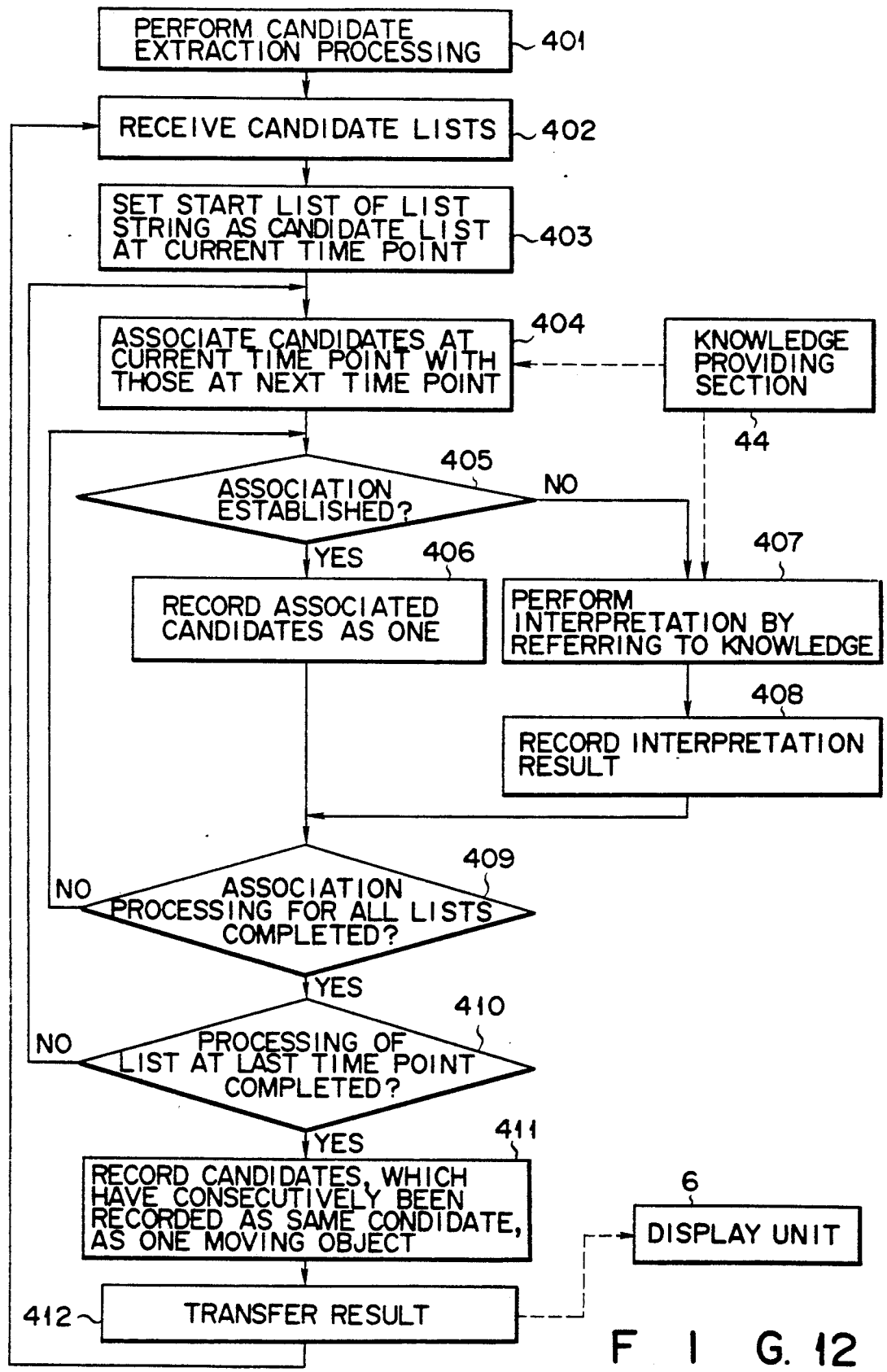
FIG. 12 is a flow chart for explaining an operation of the embodiment in FIG. 10.

FIG. 12 is a flow chart showing result interpretation processing to be performed by the result interpreting section 450.

The result interpreting section 450 receives a candidate list string formed by the candidate extracting section 440 (step 402). The start list of the candidate list string is set as a candidate list at a current time point (step 403).

The candidates of a candidate list at a current time point (time t) and those of a candidate list at the next time point (time t+Δt) are associated with each other (step 404). The candidate list at the current time point may include candidates before a previous time point (time t−Δt) at which processing is reserved under conditions to be described later. In this step, the simplest method of associating candidates is to associate candidates to which the maximum number of tracking units 310 belong. Alternatively, a candidate associating operation can be performed by extracting information from candidates, such as information about how a group of tracking units 310 belonging to each candidate change with time (continuity of motion of the tracking unit), information about the smoothness of the moving path of each tracking unit 310 or candidate (continuity of movement), and information about how the mutual positional relationship between the tracking units 310 belonging to each candidate change with time (continuity of the structure), and associating candidates which are interpreted as more continuous candidates.

The knowledge used to associate candidates may be recorded in the knowledge providing section 460 instead of recording it in the result interpreting section 450, so that the knowledge providing section 460 is sequentially referred to. With this arrangement, when interpretation of tracking results proceeds, new knowledge about an intruding object, which is obtained in the process of interpretation, can be registered in the knowledge providing section 460. In addition, this new knowledge can be provided to the candidate extracting section 440 as needed.

When candidates at two consecutive time points can be associated with each other (YES in step 405), information indicating that the two candidates represent the same object is recorded in the candidate list (step 06). If no association can be established between candidates at two time points (NO in step 405), interpretation is performed by referring to knowledge about the type or the like of each candidate recorded in the knowledge providing section 460 (step 407), and the most proper interpretation result is recorded (step 408). If, for example, association between candidates cannot be established in an area near the boundary of a monitor area, or in an area recorded as an entrance and exit, such candidates can be recorded as candidates which have moved outside the monitor area If association between candidates at a place other than the above-mentioned areas cannot be established, the corresponding candidates are recorded as candidates which have temporarily disappeared (hidden by an object or crossing another moving object), and are temporarily preserved. With this operation, association with candidates subsequent to the next time point can be established. Furthermore, data which is registered in the knowledge providing section 460 but cannot be interpreted is recorded as data which cannot be interpreted.

When processing of all the candidate lists at the current time is completed (YES in step 409), if the current time point does not coincide with the last time point of the candidate list string, the next time point is regarded as a current time point. If NO in step 409, processing from step 405 is repeatedly performed.

If association of the candidate list string is made at all the time points (lists from the current time point to the last time point) is completed (YES in step 410), a plurality of candidates which are associated with each other time-consecutively and are recorded as the same candidate are rerecorded as candidates for the same moving object (step 411). If next processing such as result display processing is present, the results are transferred to the second display unit 600 (step 412). If no next processing is present (NO in step 410), the processing from step 404 is repeated. If processing for all the data is completed, the flow returns to step 402 to receive a new candidate list string, and the subsequent processing is repeated.

Figures 13A, 13B, 13C:
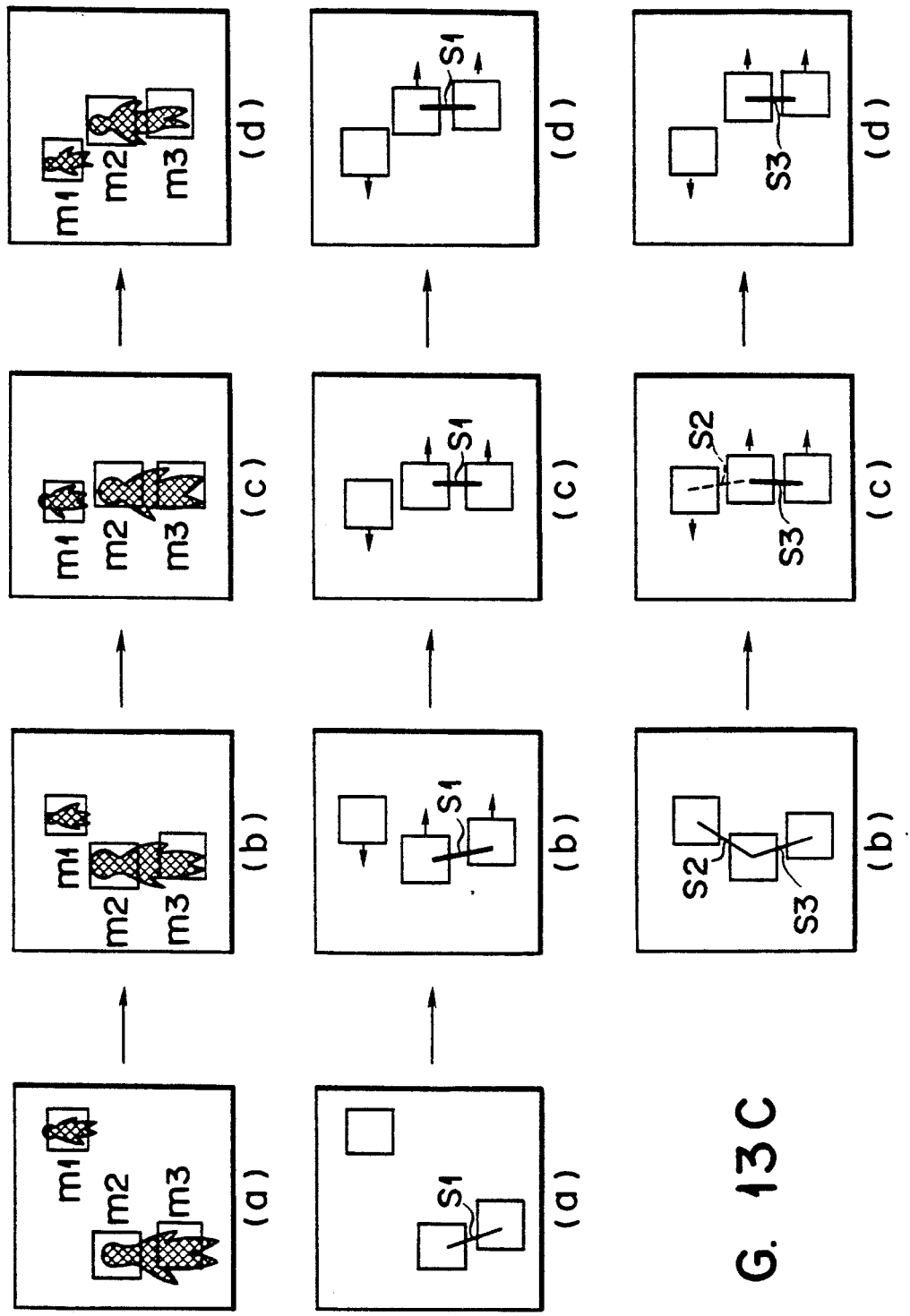
FIGS. 13A(a) to 13C(d) are views for explaining an operation of the embodiment in FIG. 10.

FIGS. 13A to 13C illustrate the results obtained by the above-described processing in the candidate extracting section 440 and the result interpreting section 450. The flow of processing will be described in more detail below with reference to FIGS. 13A to 13C.

FIGS. 13A to 13C illustrate the state (FIGS. 13A(a) to 13A(d)) of the screen of the second display unit 600 at a total of four time points at which tracking processing is performed when two intruders exist in a detection area, and associations assumed between the tracking units 310 at the respective time points (FIGS. 13B(a) to 13B(d) and FIGS. 13C(b) to 13C(d)).

The processing in FIG. 13B(a) to FIG. 13B(d) will be described below.

Assume that tracking processing is performed by three tracking units 310, and that one of these tracking units 310 (corresponding to "m1" in FIGS. 13A(a) to 13A(d)) is tracking an intruder passing through a remote portion in a detection area, while the remaining two tracking units 310 (corresponding to "m2" and "m3" in FIGS. 13A(a) to 13A(d)) are simultaneously tracking the other intruder passing near the TV camera.

In candidate extraction processing in the candidate extracting section 440, the functions F and G included in the above-mentioned estimation function are functions for calculating an association strength in such a manner that the association strength is increased as the positions and speeds (directions and magnitudes) of the two tracking units 310 become close to each other. The coefficient Kp(t) of the function F is close to "1" in an initial period of tracking but is abruptly decreased to be close to "0" as the tracking processing proceeds. In contrast to this, the coefficient Kv(t) of the function G is "0" in an initial period of tracking but is increased to be close to "1" as the processing proceeds.

When the coefficients Kp(t) and Kv(t) are set as described above, an association strength is determined in an initial period of tracking on the basis of the distance between the tracking units 310. FIG. 13B(a), which illustrates a state in an initial period of tracking, shows the positions of the tracking units 310 (rectangles in FIG. 13(a) representing tracking areas) at the time point when they are arranged, and one of associations assumed between the tracking units 310 which has a strength (represented by a line S1 in FIG. 13B(a), with the thickness of the line indicating a strength) higher than a predetermined threshold value. In the initial period of tracking, since no movement information is provided from the tracking units 310, association strengths are calculated on the basis of only the distances between the respective tracking units 310. In this case, only the association between the tracking units m2 and m3, located close to each other, has a high strength higher than the predetermined threshold value, and hence only the association S1 is established.

As a candidate extraction processing result at the initial time point of tracking, therefore, candidates for a total of two moving objects including an object belonging to only the unit m1 and an object belonging to the units m2 and m3 connected through the association S1 are output. The respective candidates corresponds to intruders, and hence proper candidates for the moving objects are extracted.

When the tracking processing in each tracking unit 310 proceeds to the next time point (FIG. 13B(b)), the distance between the unit m1 and the other units m2 and m3 is reduced. In this case, if the coefficients of the estimation function in the initial period of tracking are kept unchanged, the association strengths between the respective tracking units 310 are calculated to be higher than the threshold value, and the respective units are associated with each other.

However, as the tracking processing proceeds, the coefficient Kp of the estimation function is reduced, and the coefficient Kv is increased. For this reason, the calculation of association strengths is affected more by the directions and magnitudes of motions than by the distances between the tracking units 310. Therefore, in this case (FIG. 13B(b)), it is determined that only the association S1 has a strength higher than the threshold value, similar to the case at the previous time point. As a result, proper candidates for the moving objects corresponding to the intruders are extracted, similar to the case at the previous time point.

Similarly, even if the distances between the respective tracking units 310 are reduced at time points (FIGS. 13B(c) and 13B(d)) subsequent to the time point in FIG. 13B(b), proper candidates for the moving objects can be extracted. In this case, since the coefficient Kv is further increased, if the respective tracking units 310 continue the same movement, the strength of the already-established association is increased as the tracking processing proceeds.

Subsequently, the result interpreting section 450 receives the result obtained by the candidate extraction processing as a time series list, and associates timeconsecutive candidates based on the same tracking unit 310. In addition, the result interpreting section 450 interprets the associated candidates as candidates indicating the same moving object, and finally performs the process for obtaining the moving path of the moving object in the detection area.

In the above case, even if no knowledge is recorded in the result interpreting section 450 or no knowledge providing section 460 is arranged, moving objects can be properly detected. A case wherein moving objects can be detected by using knowledge will be described next with reference to FIGS. 13C(b) to 13C(d).

In this case, tracking processing is started from the time point in FIG. 13A(b), an entrance and exit is present at, e.g., the position where the remote intruder is detected, and the two intruders are located close to each other at the time point of detection. In this case, when the tracking units 310 are arranged at the time point in FIG. 13A(b), the distance between the tracking units 310 corresponding to m1 and m2 and between the tracking units 310 corresponding to m2 and m3 are substantially equal to each other. For this reason, the strengths of the associations (S2 an S3 in FIG. 13C(b)) between the respective tracking units 310 become substantially the same value exceeding the threshold value. Since the three tracking units are associated with each other at this time, only one group including all the three tracking units 310 is output as a candidate for a moving object as a result of candidate extraction processing. In this case, the candidate extraction is erroneously performed.

At the next time point (FIG. 13C(c)), although the positions of the tracking units 310 are changed as the tracking processing proceeds, the distances between the respective tracking units 310, which have been associated with each other at the previous time point, are not changed much. At this time point, the coefficient Kp of the function F is small but the coefficient Kv of the function G is large. In this state, although the distances between the respective tracking units 310 are not changed much, the association strengths are changed in such a manner that the strength of association between the tracking units 310 which are moving in the same manner is increased (in FIG. 13C(c), the strength of the association S2 is reduced, but the strength of the association S3 is increased). However, since all the three tracking units 310 are still associated with each other, only one candidate is erroneously extracted. At the next time point (FIG. 13C(d)) at which the tracking processing further proceeds, the coefficient Kv is increased, and only the tracking units 310 which move at similar speeds are associated with each other (S3 in FIG. 13C(d)). Therefore, candidates for two objects, i.e., an object belonging to only m1 and an object belonging to m2 and m3, are output. That is, the proper candidates for the moving objects are output.

In the candidate list obtained by the abovedescribed candidate extraction processing, only one candidate exists at first, but is divided into candidates halfway, and two candidates are finally present. In this state, a moving object cannot be properly detected. If, however, the following condition of associations is recorded as knowledge in the result interpreting section 450: "an association whose strength is decreased at a constant rate to a value below a threshold value is a wrong association", the association S2 can be interpreted as a wrong association on the basis of the knowledge. Therefore, the candidate can be divided into proper candidates corresponding to the respective moving objects.

The above-mentioned knowledge may be recorded in the knowledge providing section 460 to provide only knowledge corresponding to a reference request from the result interpreting section 450.

The present invention is not limited to the above-described embodiments. Various changes and modifications can be made within the spirit and scope of the invention.

In the above embodiments, the portion associated with change detection and the portion associated with tracking processing are respectively realized by a special circuit and a multiprocessor system. The portions associated with tracking unit control and tracking result determination in the first embodiment, and the portions associated with tracking unit control, candidate extraction, result interpretation, and knowledge providing processing in the second embodiment are realized by the display monitoring system control section. With this arrangement, high-speed processing can be performed to properly respond to a target object which moves at high speed. However, depending on an application, all or part of processing may be performed by a DSP (Digital Signal Processor) or a special circuit, and the remaining processing may be performed by a microprocessor or a digital computer. In addition, all process can be performed by a microprocessor or a digital computer.

Modifications associated with the change detecting section 200 will be described below.

(1) In the above embodiments, a changing area is extracted on the basis of the difference between a reference frame and a current frame. However, this operation may be performed by differential (difference calculation) processing of two or more consecutive images. In this case, although the possibility that a changing area is erroneously detected due to environmental variations is reduced, since the contour of an object is detected, a consistent associated component is not easily formed. For this reason, a tracking area must be set by dividing a properly extracted changing area. In addition, the center of the tracking area need not be the center of gravity of an associated component but may be arbitrarily set to provide a better effect in some case.

(2) When a reference image is to be used, in order to prevent erroneous detection of a changing area due to environmental variations, the reference image may be modified at proper time intervals.

(3) In the above embodiments, a changing area is extracted by performing binarization using a fixed threshold value. If, however, the threshold value is variably changed in accordance with the density of each portion of the image, a change can be reliably detected.

(4) In the above embodiments, changes are considered only in terms of brightness. However, a method of detecting changes on the basis of changes in color or texture may be simply used depending on an application. If it is known in advance that a target object has a specific color, a change can be reliably detected by detecting a change in color or by assemblying a plurality of change detections. In this case, depending on a target object, a change can be properly detected only by certain processing. In such a case, the method used in the change detection should be transferred to the tracking step so that tracking processing is also performed in consideration of the used method, thus improving the reliability of processing.

(5) In the above embodiments, only the sizes of changing areas are taken into consideration to determine which one of the areas is to be tracked. However, if a changing area is selected in consideration of information about the shapes of changing areas in addition to their sizes, a target can be more reliably selected. Since the contour of a still object tends to be mistaken for a changing portion due to the difference between the contour and the background, the following processing may be additionally performed: removing edges such as the contour mentioned above, or neglecting changes occurring at positions where it is known that still objects are present.

Modifications associated with the tracking section 300 will be described below.

(1) In the tracking method of the above embodiments, a moving direction is obtained on the basis of changes in density of peripheral portions of a target point with the lapse of time. This method allows high-speed processing and is advantageous with high reliability in operation when it is applied to a case wherein a moving object is tracked. However, since the characteristics of the target object are not taken into consideration, if another moving object comes close to the target object, the direction data of another object may be erroneously output. The tracking method of the above embodiments can solve this problem. This is because, in tracking result determination processing, moving vectors are written in the direction-based table in units of a proper number of frames, i.e., one to several frames, and one continuous movement is determined on the basis of the direction-based table, so that the trace of each object can be collectively determined from divided small consecutive movements and a large overall movement.

(2) The above-described problem may be solved by using a tracking method in which the characteristics of a target object are taken into consideration. For example, referring to FIG. 4, correlation coefficients between an image of a small area r0, as the center of a tracking area R, at a current time point and images of all small areas around the area r0 within a predetermined range at the next time point are obtained, and tracking is performed in the direction of the maximum correlation value. Alternatively, correlation values with eight areas r1 to r8 are obtained, and areas around an area having a large correlation coefficient may be checked in detail.

In a simpler method, in order to check the similarity between the small area r0 and surrounding small areas instead of checking correlation, the absolute values of the differences between pixels at corresponding positions are obtained, and the sum of the absolute values is obtained. Alternatively, the SSDA (Sequential Similarity Detection Algorithm) as a high-speed processing method may be used. In the SSDA method, when a certain small area is to be checked in the process of obtaining a position where the sum of the absolute values of differences becomes minimum by sequentially changing small areas to be compared, the absolute values of differences in the respective areas are obtained and added together. When the addition value exceeds the minimum sum, since the sum of differences in this small area is larger than the minimum value, further addition becomes meaningless. Hence, the calculation is interrupted, and the flow of processing advances to the step of processing the next small area. In such a case, since the characteristics of an object are considered, the probability that the same object is tracked is high. However, since a position of high correlation cannot be clearly obtained in many cases, tracking often fails.

(3) The present invention may employ a method of tracking by obtaining a feature such as an edge or a corner, and continuously obtaining the position of the feature. This method allows a reliable operation when a feature can be clearly obtained. However, the method cannot be properly applied to a target object whose feature point is difficult to obtain.

An appropriate feature for a target object may be selected for use. Several features changing areas may be tracked and a portion which can be properly tracked may be used as a feature. Alternatively, a tracking result is transferred to the step of performing tracking result determination processing to detect significant movement. In this case, although a large calculation capacity is required to perform a plurality of processes, the reliability in processing is improved.

(4) The application range of the tracking method used in the above embodiments can be expanded by changing the tracking characteristics of each tracking unit 310.

Figure 7:
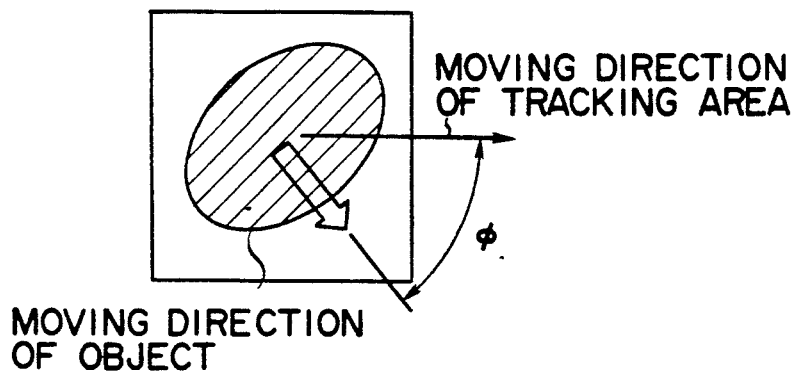
FIG. 7 is a view for explaining tracking processing in a direction deviated from the moving direction of an object by $\phi$.

For example, by changing the sign of the coefficient f, the characteristics with respect to an object can be changed. If the coefficient f is positive, tracking characteristics for approaching an object can be realized. If the coefficient f is negative, tracking characteristics for separating from an object can be realized. As indicated by the following equations, by rotating a moving vector (u,v) by an angle $\phi$, a corresponding module can be caused to track an object in a direction deviated from the movement of the object by the angle $\phi$, as shown in FIG. 7.

$$u' = u \times \cos\phi - v \times \sin\phi$$

$$v' = u \times \cos\phi + v \times \sin\phi$$

Figure 8:
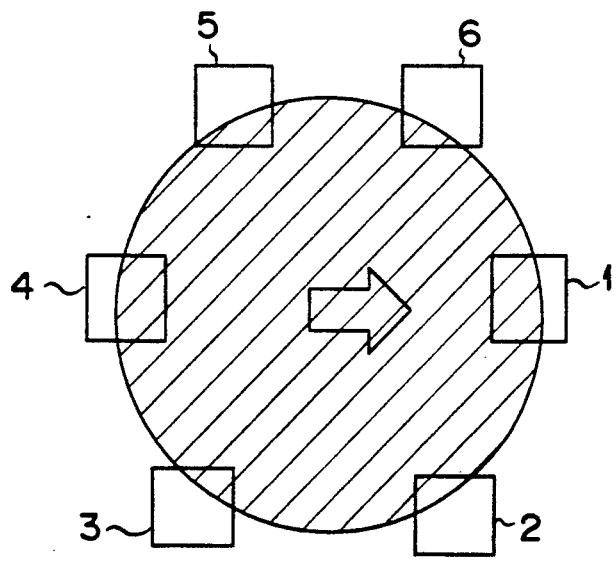
FIG. 8 is a view for explaining selective tracking processing of the edges of an object.

By combining the above-described characteristics, the respective modules can be selectively caused to track the front edge, rear edge, front oblique edge, rear oblique edge, and the like of an object, as shown in FIG. 8. The above method may be performed by substituting a weight w(1) in d(i) corresponding to each small area to change the sign and the absolute value, as indicated by the following equations:

$$u = \sum_{i=0}^{8} w_x(i) \cdot d(i) \cdot xi / \sum_{i=0}^{8} d(i)$$

$$v = \sum_{i=0}^{8} w_y(i) \cdot d(i) \cdot yi / \sum_{i=0}^{8} d(i)$$

(Note that $\sum_{i=0}^{8}$ can be rewritten into a general form of $\sum_{i=0}^{nm-1}$)

That is, tracking can be performed while predicting the moving direction of the object from, e.g., past moving vectors by using the weight w(i).

Figure 9:
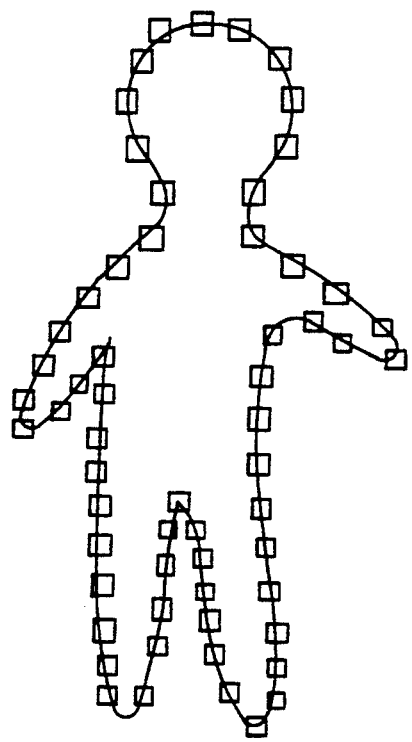
FIG. 9 is a view for explaining extraction processing of the contour of an object.

(5) As an application of the above method, the contour of an object can be extracted by arranging a large number of modules, as shown in FIG. 9. In this case, a display monitoring system control section controls the respective modules to prevent the modules from tracking the same portion and from separating from the object due to external disturbances. Alternatively, the tracking units may communicate with each other to control or restrict each other.

The above-described contour extraction method uses movement information from a large number of modules as compared with the conventional difference calculation method or binarization method. For this reason, this method is not easily disturbed by environmental influences and hence allows reliable extraction of a contour. The method allows detection of the movement of an object simultaneously with contour extraction. The object can be identified by collating the contour information and the movement information of the object with the preset shape pattern and movement pattern of the object.

The above-described series of methods can be realized by one tracking unit. In this case, it serves as a module for tracking an object and extracting its contour.

Modifications of the candidate extraction processing performed by the candidate extracting section 440 will be described below.

(1) Only information relating to the moving path of each tracking unit, such as position and speed information of each tracking unit within an image, is used to the estimation function used for candidate extraction processing. However, feature amounts of, e.g., color and shape, obtained from the tracking area of each tracking unit may be added to the information. Assume that a plurality of tracking units are concurrently tracking body portions of an intruder in red clothing. If the process for determining the identity of the intruder is additionally performed upon extraction of color information from the tracking area of each tracking unit, a candidate can be easily extracted by associating the information from the tracking unit.

(2) The estimation function used for calculating the association strengths between the tracking units in candidate extraction processing may be replaced with the process for extracting a candidate for a moving object by using knowledge associated with the positions and speeds of tracking units, attribute values such as the colors and shapes of changing areas which are being tracked, and the preset shape and movement information of an intruder.

An example of this processing will be described below. Processing modules are prepared. Each module compares the respective information described above between two tracking units and converts the comparison result into numerical values indicating whether the compared information are close to each other (i.e., moving objects resemble each other or the same moving object is tracked). Output results from the respective processing modules may be simply added together. Alternatively, the priorities of the respective information are determined, and a weighted sum obtained by weighting in accordance with the priorities is used as an association strength. For example, by using information associated with the shape of an intruder, the probability of obtaining an accurate result indicating that a candidate for a moving object is an intruder is increased. Instead of using association strengths expressed as numerical values, a rule-based processing form may be used, in which each processing module determines whether corresponding tracking units belong to the same candidate, and the determination result is interpreted in accordance with the priorities. Furthermore, it is apparent that the above-mentioned knowledge may be stored in the knowledge providing section 460 in advance, instead of storing it in the candidate extraction section, so that the knowledge can be provided in response to a request in candidate extraction processing.

(3) Each candidate list formed by the candidate extracting section 440 need not be constituted by only a group of tracking units but may include the overall position information of the candidates and attribute values such as color and shape information obtained from areas to which the tracking units are assigned. In this case, feature extraction processing is performed in addition to candidate extraction processing so that when candidate are extracted by the candidate extraction processing, feature information can be simultaneously extracted from areas in an image in which the candidates exists. The extracted feature information is then added to the candidate information to form a candidate list. If additional attribute values are included in candidate data, association processing is facilitated by adding the process for determining the similarity of attribute values to the process for associating candidates in the result interpreting section 450. In addition, the reliability of the association processing result is increased. The feature extraction processing need not be included in the candidate extraction processing but may be performed parallel as independent processing so that the feature extraction processing can be sequentially performed in response to requests from the candidate extraction processing.

In the above embodiments, the candidate extraction section 440, the result interpreting section 450, and the knowledge providing section 460 are simultaneously operated in the same display monitoring system control section 400. However, one or all of these components may be simultaneously operated in another display monitoring system control section. In this case, since each processing is divided into small units to be performed by a plurality of computers, each processing can be executed at high speed, thus allowing tracking and result interpretation processing at shorter time intervals. Therefore, more detailed information about an intruding object can be extracted. In addition, this processing allows detection of an intruding object which moves faster than an intruding object which can be detected by the divisional processing.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A display monitoring system comprising:

image pickup means for picking up an image including at least one of an object to be picked up and a background;

change detecting means for detecting an area in which a portion of the picked up changes, said change detecting means including reference image storage means for storing a background image, as a reference image, which corresponds to the background picked u by said image pickup means, difference calculating means for obtaining differences between the reference image and the image including the object and the background, and outputting difference values, binarizing means for binarizing difference values higher than a predetermined threshold value, and extracting the binarized values as a plurality of changing areas, and labeling means for providing different labels for a plurality of blocks associated with each other as the changing areas, obtaining the area, position of center of gravity, and circumscribed rectangle of each of the blocks, and outputting measurement data;

tracking means for tracking the changing areas, said tracking means including at least one tracking element having tracking area setting means which moves upon movement of the block and sets a rectangular area including the rectangle as a tracking area, with the rectangle located in the center of the tracking area, small moving direction detecting area setting means for setting a plurality of small areas in the tracking area, and moving vector calculating means for calculating movement amounts of the changing areas in accordance with changes in parameter of each of the small areas; and display monitoring system control means for controlling said tracking means, performing determination of a tracking result, and performing predetermined processing by using the output from said labeling means, said display monitoring system control means including tracking section control means for controlling said tracking means and tracking result processing means for determining on the basis of the tracking result from said tracking means whether the changing areas originate from an intruding object, and performing predetermined processing.

2. A system according to claim 1, further comprising display unit control means for outputting data of the tracking area as data of a rectangular frame, and display means for displaying the image picked up by said image pickup means together with the tracking area.

3. A system according to claim 1, wherein said change detecting means includes means for detecting the changing area on the basis of a difference between at least two images with respect to time.

4. A system according to claim 1, wherein said reference image storage means includes means for updating the reference image after the lapse of a predetermined period of time.

5. A system according to claim 1, wherein said tracking means includes a plurality of tracking elements, and said tracking result processing means includes candidate extracting means for obtaining a virtual association strength between said tracking elements for tracking the changing areas, and extracting each of groups of said tracking elements whose association strengths are higher than a predetermined value as candidates for moving objects, and result interpreting means for interpreting extraction results obtained by said candidate extracting means and forming moving paths of the moving object candidates.

6. A system according to claim 5, further comprising second display means for displaying interpretations of the tracking results by said result interpreting means.

7. A display monitoring system comprising:

image pickup means for picking up an image including at least one of an object to be picked up and a background;

change detecting means for detecting an area in which a portion of the picked-up image changes, said change detecting means including reference image storage means for storing a background image, as a reference image, which corresponds to the background picked up by said image pickup means, difference calculating means for obtaining differences between the reference image and the image including the object and the background, and outputting difference values, binarizing means for binarizing difference values higher than a predetermined threshold value, and extracting the binarized values as a plurality of changing areas, and labeling means for providing different labels for a plurality of blocks associated with each other as the changing areas, obtaining the area, position of center of gravity, and circumscribed rectangle of each of the blocks, and outputting measurement data;

tracking means for tracking the changing areas, said tracking means including at least one tracking element having tracking area setting means which moves upon movement of the block and sets a rectangular area including the rectangle as a tracking area, with the rectangle located in the center of the tracking area, small moving direction detecting area setting means for setting a plurality of small areas in the tracking area, and moving vector calculating means for calculating movement amounts of the changing areas in accordance with changes in parameter of each of the small areas;

display monitoring system control means for controlling said tracking means, performing determination of a tracking result, and performing predetermined processing by using the output from said labeling means, said display monitoring system control means including tracking section control means for controlling said tracking means, candidate extracting means for obtaining a virtual association strength between said tracking elements for tracking the changing areas, and extracting each of groups of said tracking elements whose association strengths are higher than a predetermined value as candidates for moving objects, and result interpreting means for interpreting extraction results obtained by said candidate extracting means and forming moving paths of the moving object candidates;

display unit control means for outputting data of the tracking area as data of a rectangular frame;

first display means for displaying the image picked up by said image pickup means together with the tracking area; and second display means for displaying an interpretation of the tracking result obtained by said result interpreting means.

8. A display monitoring system comprising:

change detecting means for detecting image changing areas in a picked-up image;

tracking means having at least two tracking elements for tracking the changing areas detected by said change detecting means;

candidate extracting means for obtaining a virtual association strength between said tracking elements for tracking the changing areas, and extracting each of groups of said tracking elements whose association strengths are higher than a predetermined value as candidates for moving objects; and result interpreting means for interpreting extraction results obtained by said candidate extracting means and forming moving paths of the moving object candidates.

9. A system according to claim 8, wherein said candidate extracting means includes means for calculating a virtual association strength between said tracking elements by using an estimation function assuming a large value when moving paths of said tracking element are similar to each other.

10. A system according to claim 8, wherein said candidate extracting means includes means for extracting groups of said tracking elements, as moving object candidates, which have association strengths higher than a predetermined value at all time points when the changing areas are tracked by said tracking means.

11. A system according to claim 8, further comprising means for causing said candidate extracting means to form a candidate list, constituted by tracking element groups as moving object candidates, at each time point, and causing said result interpreting means to convert the candidate list string into a data string representing moving paths of moving objects.

12. A system according to claim 8, further comprising knowledge providing means for providing knowledge requested by said candidate extracting means and said result interpreting means.

13. A system according to claim 8, wherein said result interpreting means includes means for associating candidates for moving objects which can be determined to be identical from candidate extraction results obtained by said candidate extracting means at a plurality of consecutive time points.

* * * * *

UNITED STATES PATENT AND TRADEMARK OFFICE
CERTIFICATE OF CORRECTION

PATENT NO. : 5,243,418
DATED : September 7, 1993
INVENTOR(S) : Yoshinori Kuno et al.

It is certified that error appears in the above-indentified patent and that said Letters Patent is hereby corrected as shown below:

On the title page, Item [54], Column 1 and Line 1,

The title, should read: --DISPLAY MONITORING SYSTEM FOR DETECTING AND TRACKING AN INTRUDER IN A MONITOR AREA--

Signed and Sealed this

Twenty-second Day of March, 1994

Attest:

BRUCE LEHMAN

*Attesting Officer*            *Commissioner of Patents and Trademarks*